Patented July 9, 1940

2,207,623

UNITED STATES PATENT OFFICE 2,207,623

POLYSTYRENE COATING COMPOSITION

Toivo A. Kauppi and Kenneth D. Bacon, Midland, Mich., assignors to The Dow Chemical Company, Midland, Mich., a corporation of Michigan No Drawing. Application September 17, 1938, Serial No. 230,521

6 Claims. (Cl. 260—32)

This invention relates to liquid coating compositions comprising polymerized styrene as the essential film-forming material.

A considerable number of polystyrene lacquers and varnishes have been described in the prior art. For the most part the solvents used in formulating these coating compositions were aromatic hydrocarbons or mixtures thereof, such as "solvent naphtha," although in some instances mixtures of aromatic hydrocarbons with other polystyrene solvents, e. g. ethyl acetate or acetone, have been employed. Unfortunately, the lacquers prepared with such known solvents are disadvantageous in that they require a long drying time and frequently produce films having a hazy, striated appearance. In addition, such lacquers have a relatively high viscosity, and hence must be formulated with a low solids content in order to be readily applicable to surfaces of metal or wood.

An object of the present invention is to provide a polystyrene coating composition which does not possess the disadvantages inherent in the prior art products. Another object is to prepare polysyrene lacquers having a low viscosity and a high solids content, the solvent portion of which evaporates rapidly leaving a clear, smooth coating having good physical properties.

In preparing lacquers according to the invention, polystyrene is dissolved in a solvent comprising at least 50 per cent by volume of an aromatic or hydro-aromatic hydrocarbon liquid and a substantial proportion, e. g. at least 20 per cent, of an aliphatic hydrocarbon liquid. The lacquers so obtained dry rapidly, giving "tack-free" films in about half the time required with ordinary polystyrene coating compositions. In addition, the new lacquers have a low viscosity, and may be applied to surfaces by spraying or brushing much more readily than solutions of polystyrene in aromatic hydrocarbons only. If desired, lacquers having a higher polystyrene content than has heretofore been practical may be prepared.

Among the aromatic and hydro-aromatic hydrocarbon liquids which may be employed in formulating our new lacquers are the simple hydrocarbons, e. g. benzene, toluene, xylene, tetrahydrobenzene, etc., mixtures of such hydrocarbons and various proprietary solvents such as coal-tar naphthas, and the like. For most lacquers it is preferable to choose an aromatic liquid having a boiling point below about 200° C.

The aliphatic constituent of our new polystyrene lacquer solvent is usually a petroleum distillate which by itself is a non-solvent for polystyrene, e. g. "petrobenzol," "troluoil," or other aliphatic naphthas. However, other aliphatic hydrocarbons, e. g. hexane, heptene, etc., may also be employed. In view of the insolubility of polystyrene in these aliphatic solvents, when preparing our new lacquers it is desirable in each instance to choose an aliphatic hydrocarbon liquid having an evaporation rate approximately equal to or greater than that of the aromatic hydrocarbon liquid being used. (In practice, an aliphatic hydrocarbon having a boiling point the same as or lower than that of the aromatic solvent is chosen.) In this way, when the lacquer dries, the aliphatic constituent of the solvent evaporates before or together with the aromatic constituent, and the polystyrene film is maintained at maximum clarity and uniformity. Optimum results are attained when the evaporation rate of the aliphatic hydrocarbon liquid is equal to or very slightly faster than that of the aromatic hydrocarbon liquid.

The decrease in drying time of our new lacquers occasioned by the presence of the aliphatic hydrocarbon is more than that due to rapid evaporation of the latter. As is well known, polystyrene films tend to retain aromatic hydrocarbon solvents with extreme tenacity, an effect which results not only in a lowered drying rate, but also in disadvantageous strength characteristics of the film itself. In our new lacquers, however, the aliphatic hydrocarbons, in evaporating, tend to drive out the aromatic hydrocarbons, thereby not only decreasing the drying time to an exceptional extent, but also improving the properties of the resulting polystyrene film.

This beneficial action of the aliphatic hydrocarbon liquid on polystyrene coating compositions is not limited to lacquers consisting only of polystyrene, an aromatic or hydro-aromatic hydrocarbon liquid, and an aliphatic hydrocarbon liquid. The polystyrene may be admixed with plasticizers, gums, drying oils, etc., in instances where films having special properties are desired. Similarly, other polystyrene solvents, such as ketones, esters, or chlorinated aliphatic hydrocarbons, may be added to the lacquer in amounts up to 30 per cent without appreciably diminishing the advantageous effect of the aliphatic hydrocarbon liquid.

In their preferred form, the coating compositions of the invention consist essentially of 5 to 100 parts by weight of polystyrene or plasticized polystyrene per 100 parts by weight of the solvent, the latter comprising at least 50 per cent by volume of an aromatic or hydroaromatic hydrocarbon liquid and at least 20 per cent of an aliphatic hydrocarbon liquid having an evaporation rate not less than that of the aromatic hydrocarbon liquid.

The following examples are illustrative of our invention, but are not to be considered as limitative:

Example 1

A series of lacquers was prepared by dissolving 10 grams of polystyrene in 100 c. c. of each of various mixtures of benzene and "petrobenzol" (an aliphatic petroleum distillate having a boiling range of about 68°–93° C.). The viscosity at 25° C. and the specific gravity of the lacquers so prepared were measured. The drying time of the lacquers was then determined by spreading the solution on a glass plate and noting the time required for the film to dry to an extent such that it was no longer sticky or "tacky." In the following table, run $a$ was made with benzene alone as the solvent and is given for comparison with runs $b$, $c$, and $d$, which are in accordance with the invention.

| | Solvent (parts by volume) | | Lacquer | | |
|---|---|---|---|---|---|
| | Benzene | Petrobenzol | Specific gravity | Viscosity (centipoises) | Drying time (70° F.) |
| | | | | | Minutes |
| a | 100 | | 0.893 | 20.4 | 2½ |
| b | 80 | 20 | 0.845 | 21.4 | 1½ |
| c | 60 | 40 | 0.825 | 18.7 | 1½ |
| d | 50 | 50 | 0.795 | 14.3 | 1½ |

Example 2

A lacquer was prepared by dissolving 13.6 grams of polystyrene and 6.4 grams of tricresyl phosphate in 100 c. c. of a mixture containing equal volumes of toluene and "troluoil" (an aliphatic petroleum distillate having a boiling range of about 97°–120° C.). This composition had a viscosity of 37.4 centipoises at 25° C., and a drying time of 16 minutes at 70° F. The corresponding lacquer made using toluene only as the solvent had a viscosity of 63.8 centipoises and a drying time of 22 minutes.

Example 3

Lacquers were prepared by dissolving 13.6 grams of polystyrene and 6.4 grams of phenyl di-ortho-xenyl phosphate in 100 c. c. of the solutions defined by the following table. The viscosities and drying times were determined as in Example 1. Run $a$ was made with toluene alone, and is given for comparison with runs $b$ and $c$, which are according to the invention.

| | Solvent (parts by volume) | | | Lacquer | |
|---|---|---|---|---|---|
| | Toluene | Troluoil | Ethyl acetate | Viscosity (c. p. at 25° C.) | Drying time |
| | | | | | Minutes |
| a | 100 | | | 66.0 | 22 |
| b | 50 | 50 | | 20.8 | 15 |
| c | 50 | 30 | 20 | 46.7 | 17 |

The lacquers of the three foregoing examples were readily applied to metal surfaces by dipping, and gave clear films free of striations.

Example 4

A lacquer was prepared by dissolving 10 grams of polystyrene in 100 c. c. of a mixture containing 60 per cent of "Hi-Flash naphtha" (an aromatic coal tar naphtha having a boiling range of about 150°–200° C.) and 40 per cent of "V. M. P. naphtha" (an aliphatic petroleum distillate having a boiling range of about 110°–170° C.). This lacquer was applied to metal surfaces by spraying and by brushing on, and gave glossy films free from haze or striations.

In addition to mixtures of the aromatic or hydroaromatic and aliphatic hydrocarbons hereinbefore disclosed, we may also employ various proprietary solvents which consist of a mixture of at least 50 per cent of an aromatic or hydroaromatic hydrocarbon liquid and a substantial proportion of an aliphatic hydrocarbon liquid. Examples of such mixtures are certain hydrogenated cracked hydrocarbon oils, sold under the Trade-names "Solvesso No. 1," "Solvesso No. 2," etc., and certain mixed aromatic-aliphatic fractions extracted from asphalt-base petroleum, such as "Union Aromatic Solvent No. 8," etc.

Other modes of applying the principles of the invention may be employed instead of those explained, change being made as regards the details hereinbefore disclosed, provided the compositions defined by any of the following claims, or the equivalent of such stated compositions, be employed.

We claim:

1. A coating composition consisting essentially of polystyrene and a solvent therefor comprising at least 50 per cent by volume of a liquid selected from the class consisting of aromatic and hydroaromatic hydrocarbon liquids having a boiling point below 200° C., and at least 20 per cent of an aliphatic hydrocarbon liquid having a boiling point not higher than that of the aromatic hydrocarbon liquid, said composition having a low viscosity, a rapid drying rate, and giving clear, smooth coatings.

2. A coating composition consisting essentially of between 5 and 100 parts by weight polystyrene per 100 parts by weight of a solvent therefor comprising at least 50 per cent by volume of a liquid selected from the class consisting of aromatic and hydro-aromatic hydrocarbon liquids having a boiling point below 200° C., and at least 20 per cent of an aliphatic hydrocarbon liquid having a boiling point not higher than that of the aromatic hydrocarbon liquid, said composition having a low viscosity, a rapid drying rate, and giving clear, smooth coatings.

3. A coating composition consisting essentially of polystyrene and a solvent therefor comprising at least 50 per cent by volume of benzene and at least 20 per cent of an aliphatic petroleum distillate having a boiling range of about 68°–93° C., said composition having a low viscosity, a rapid drying rate, and giving clear, smooth coatings.

4. A coating composition consisting essentially of polystyrene and a solvent therefor comprising at least 50 per cent by volume of toluene and at least 20 per cent of an aliphatic petroleum distillate having a boiling range of about 97°–120° C., said composition having a low viscosity, a rapid drying rate, and giving clear, smooth coatings.

5. A coating composition consisting essentially of polystyrene and a solvent therefor comprising at least 50 per cent by volume of an aromatic coal-tar naphtha having a boiling range of about 150°–200° C. and at least 20 per cent of an aliphatic petroleum distillate having a boiling range of about 110°–170° C., said composition having a low viscosity, a rapid drying rate, and giving clear, smooth coatings.

6. A coating composition consisting essentially of polystyrene and a solvent therefor comprising at least 50 per cent by volume of a liquid selected from the class consisting of aromatic and hydroaromatic hydrocarbon liquids and at least 20 per cent of an aliphatic hydrocarbon liquid having an evaporation rate at least equal to that of the first-named liquid, said coating composition having a low viscosity, a rapid drying rate, and giving a clear, smooth coating.

TOIVO A. KAUPPI.
KENNETH D. BACON.